US011533265B2

(12) United States Patent
Gandhi et al.

(10) Patent No.: US 11,533,265 B2
(45) Date of Patent: Dec. 20, 2022

(54) ALLEVIATING FLOW CONGESTION AT FORWARDING ELEMENTS

(71) Applicant: VMWARE, INC., Palo Alto, CA (US)

(72) Inventors: Rohan Gandhi, Pune (IN); Avinash Nigam, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/016,475

(22) Filed: Sep. 10, 2020

(65) Prior Publication Data

US 2022/0029925 A1 Jan. 27, 2022

(30) Foreign Application Priority Data

Jul. 23, 2020 (IN) .............................. 202041031516

(51) Int. Cl.
*H04L 47/25* (2022.01)
*H04L 43/0882* (2022.01)

(52) U.S. Cl.
CPC .......... *H04L 47/25* (2013.01); *H04L 43/0882* (2013.01)

(58) Field of Classification Search
None
See application file for complete search history.

(56) References Cited

U.S. PATENT DOCUMENTS

| 5,029,164 | A | 7/1991 | Goldstein et al. |
| 6,262,976 | B1 | 7/2001 | McNamara |
| 7,161,902 | B2 | 1/2007 | Carter et al. |
| 9,866,441 | B2 | 1/2018 | Day |
| 10,320,681 | B2 | 6/2019 | Hira et al. |
| 10,447,544 | B2 | 10/2019 | Day |
| 2003/0069970 | A1 | 4/2003 | Kim et al. |
| 2003/0193893 | A1* | 10/2003 | Wen .................... H04L 12/5602 370/231 |
| 2004/0064557 | A1* | 4/2004 | Karnik .................. G06F 9/5055 709/225 |
| 2006/0209687 | A1* | 9/2006 | Yagawa .................. H04L 47/10 370/229 |

(Continued)

OTHER PUBLICATIONS

Alizadeh, M. et al., "CONGA: Distributed Congestion-Aware Load Balancing for Datacenters," in SIGCOMM 2014.

(Continued)

*Primary Examiner* — Joshua Joo
(74) *Attorney, Agent, or Firm* — Patterson & Sheridan, LLP

(57) ABSTRACT

A method for alleviating flow congestion at forwarding elements is provided. The method receives traffic related data from a plurality of forwarding elements of a network, and based on the traffic related data, determines congestion at a first forwarding element of the plurality of forwarding elements caused by at least one flow passing through the first forwarding element at a first rate. The method calculates, based on a burst size of the at least one flow, a second rate for the at least one flow such that when the at least one flow passes through the first forwarding element at the second rate the congestion at the first forwarding element is alleviated. The method rate limits the at least one flow by passing the at least one flow through a flow rate manager at the calculated second rate before transmitting the at least one flow to the first forwarding element.

20 Claims, 7 Drawing Sheets

(56) References Cited

U.S. PATENT DOCUMENTS

| | | | |
|---|---|---|---|
| 2008/0205266 A1* | 8/2008 | Hahm | H04L 49/90 370/229 |
| 2012/0075996 A1 | 3/2012 | Wan William Lau et al. | |
| 2013/0215743 A1* | 8/2013 | Pannell | H04L 47/10 370/230.1 |
| 2015/0138970 A1* | 5/2015 | Tabatabaee | H04L 47/12 370/230 |
| 2015/0180780 A1* | 6/2015 | Froese | H04L 47/11 370/231 |
| 2015/0281100 A1* | 10/2015 | Kurita | H04L 47/263 370/230 |
| 2016/0094450 A1* | 3/2016 | Ghanwani | H04L 47/22 370/235 |
| 2016/0134161 A1* | 5/2016 | Hui | H02J 3/383 307/66 |
| 2016/0164791 A1* | 6/2016 | Zahemszky | H04L 47/22 370/235 |
| 2016/0188378 A1 | 6/2016 | Chao et al. | |
| 2017/0026283 A1 | 1/2017 | Williams et al. | |
| 2017/0295101 A1 | 10/2017 | Hira et al. | |
| 2018/0115472 A1 | 4/2018 | Chen et al. | |
| 2018/0316571 A1 | 11/2018 | Andrade et al. | |
| 2018/0349166 A1 | 12/2018 | Movsisyan et al. | |
| 2019/0288948 A1 | 9/2019 | Hira et al. | |
| 2020/0026538 A1 | 1/2020 | Cui et al. | |
| 2020/0106671 A1 | 4/2020 | Goel et al. | |
| 2020/0159726 A1 | 5/2020 | Miller et al. | |

OTHER PUBLICATIONS

Brakmo, L. S. et al., "TCP Vegas: End to End Congestion Avoidance on a Global Internet," IEEE J.Sel. A. Commun., 2006.

Cardwell, N. et al., "BBR: Congestion-Based Congestion Control," Queue, 2016.

Chekuri, C. et al., "On Multi-dimensional Packing Problems," in SODA, 1999.

Fall, K. et al., "Comparisons of Tahoe, Reno and Sack TCP," ACM SIGCOMM CCR, 1996.

Guo, C. et al., "SecondNet: A Data Center Network Virtualization Architecture with Bandwidth Guarantees," in ACM CoNEXT, 2010.

He, K. et al., "AC/DC TCP: Virtual Congestion Control Enforcement for Datacenter Networks," in ACM SIGCOMM, 2016.

Jacobson, V., "Congestion Avoidance and Control," ACM SIGCOMM CCR, 1988.

Jang, K. et al., "Silo: Predictable Message Latency in the Cloud," 2015.

Katta, N. et al., "CLOVE: How I Learned to Stop Worrying About the Core and Love the Edge," in ACM HotNets, 2016.

Kumar, A. et al., "BwE: Flexible, Hierarchical Bandwidth Allocation for WAN Distributed Computing," in ACM SIGCOMM, 2015.

Mittal, R. et al., "TIMELY: RTT-based Congestion Control for the Datacenter," in ACM SIGCOMM, 2015.

Radhakrishnan, S. et al., "SENIC: Scalable NIC for End-Host Rate Limiting," in USENIX NSDI, 2014.

Roy, A. et al., "Inside the Social Network's (Datacenter) Network," in SIGCOMM, 2015.

Saeed, A. et al., "Carousel: Scalable Traffic Shaping at End Hosts," in ACM SIGCOMM, 2017.

Shieh, A. et al., "Sharing the Data Center Network." in Usenix NSDI, 2011.

Zhang, Q. et al., "High-Resolution Measurement of Data Center Microbursts," in ACM IMC, 2017.

Zhu, Y. et al., "ECN or Delay: Lessons Learnt from Analysis of DCQCN and TIMELY," in ACM CoNEXT, 2016.

\* cited by examiner

ALLEVIATING FLOW CONGESTION AT FORWARDING ELEMENTS

RELATED APPLICATIONS

Benefit is claimed under 35 U.S.C. 119(a)-(d) to Foreign Application Serial No. 202041031516 filed in India entitled "ALLEVIATING FLOW CONGESTION AT FORWARDING ELEMENTS", on Jul. 23, 2020, by VMware, Inc., which is herein incorporated in its entirety by reference for all purposes.

BACKGROUND

Software defined networking (SDN) comprises a plurality of hosts in communication over a physical network infrastructure (e.g., in a datacenter), each host including one or more virtualized endpoints such as virtual machines (VMs), containers, or other types of virtual computing instances (VCIs) that are connected to logical overlay network(s) implemented by hypervisors of the hosts on the underlying physical network infrastructure. The rapid growth of network virtualization has led to an increase in large scale SDN datacenters. The scale of such datacenters may be very large, often including hundreds of servers with each server hosting hundreds of VCIs that are connected to each other via different forwarding elements (e.g., switches, routers, middle boxes, etc.). With such scale comes a need to be able to operate such network topologies efficiently and avoid flow congestions that may result in downtime. A flow may refer to a set of packets communicated between a source and a destination. For example, a five-tuple of a packet's source IP address, destination IP address, protocol, source port, and destination port may identify a traffic flow. Therefore, a set of packets having the same five-tuple may be part of the same flow. In certain aspects, a flow may refer to a Transport Control Protocol (TCP) flow or other Layer 4 (L4) flows.

Conventionally, TCP running at the hosts (e.g., typically in the OS or hypervisor) has been widely used for communication between endpoints (e.g., VCIs). TCP has an inherent ability to mitigate congestion at forwarding elements. For example, a source endpoint using TCP may continually increase the packet sending rate until it receives a packet drop signal (e.g., by not receiving an acknowledgment from the destination endpoint indicating the receipt of a sent packet), which may indicate congestion at one or more forwarding elements on the packet route. Once the source endpoint receives a packet drop signal, it may reduce the packet sending rate (e.g., to ease the potential congestion). While TCP may be generally effective in reducing congestion in the network (e.g., using packet drop signals), it may hurt the network performance under some circumstances, such as during microbursts of flows, or when there are too many flows passing through the same forwarding element.

For example, TCP may not be efficient in reducing packet drops due to microbursts, where an endpoint sends packets to a forwarding element (e.g., a switch) at a very high rate for a very short time (e.g., within few micro/milliseconds) followed by an idle period. Although, TCP backs off upon realization of a congestion, it may subsequently increase the packet sending rate which may cause recurring congestions. Additionally, TCP does not always reduce the burst size which may result in bursty flows causing collateral damage, for example, by dropping packets of the same flow as well as other flows.

FIGS. 1A-1D include four diagrams 101-104 illustrating packets being dropped as a result of two bursty flows (e.g., including one or more microbursts) competing over the same forwarding element (e.g., to pass through the same link). As stated above, when two (or more) endpoints consume substantial buffer capacity of a forwarding element (e.g., as a result of generating bursty flows), the endpoints may cause packet drops in their own flows as well as in other flows that compete over the same forwarding element. Diagram 101 illustrates flow A including four microbursts at times T1, T6, T11, and T13, with some inactivity gaps in between. Similarly, diagram 102 shows that flow B has smaller (but closer) bursts at different times with no or little gap in between. When the two flows (A and B) try to pass through the same forwarding element 105 (as shown in diagram 103), they may overwhelm the forwarding element's buffer (e.g., incoming buffer of forwarding element 105) which may result in packet drops. As shown in diagram 104, at times T6 and T11, some of the packets belonging to one or both flows may be lost and not appear among the output packets of forwarding element 105 as the total packets at those times exceed the buffer capacity 107 in terms of number of packets of forwarding element 105.

Additionally, when too many flows are sharing the same link which can result in congestion, TCP makes sure that each flow receives a fair share of the bandwidth of the congested link, but this may still not solve the congestion issue. For example, when there are 10K TCP connections (or flows) sharing the same 10 Gbps link, each TCP connection will get a very small share of the bandwidth (e.g., 1 Mbps) which may result in slowing down the connections (e.g., slowing the communications between different applications running on the endpoints).

SUMMARY

Herein described are one or more embodiments of a method for alleviating flow congestion at forwarding elements. The method includes receiving traffic related data from a plurality of forwarding elements of a network. Based on the received traffic related data, the method determines congestion at a first forwarding element of the plurality of forwarding elements caused by at least one flow passing through the first forwarding element at a first rate. The method further includes calculating, based on a burst size of the at least one flow, a second rate for the at least one flow such that when the at least one flow passes through the first forwarding element at the second rate the congestion at the first forwarding element is alleviated. The method further includes rate limiting the at least one flow by passing the at least one flow through a flow rate manager at the calculated second rate before transmitting the at least one flow to the first forwarding element.

Also described herein are embodiments of a non-transitory computer readable medium comprising instructions to be executed in a computer system, wherein the instructions when executed in the computer system perform the method described above for alleviating flow congestion at forwarding elements. For example, the instructions may include code or one or more instructions for performing each step of the method.

Also described herein are embodiments of a computer system, wherein software for the computer system is programmed to execute the method described above for alleviating flow congestion at forwarding elements. For example, the computer system may include a processor coupled to a memory configured to perform each step of the method.

Also described herein are embodiments of a computer system comprising various means for executing the various steps of the method described above for alleviating flow congestion at forwarding elements.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
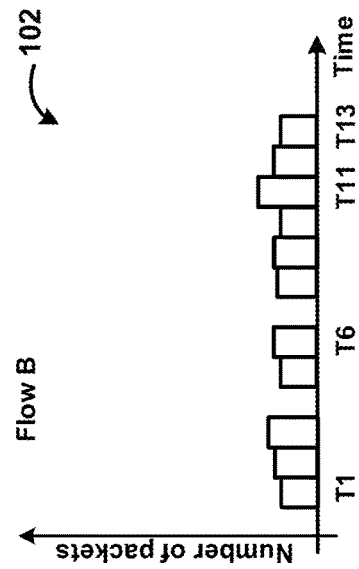
FIGS. 1A-1D include four diagrams illustrating packets being dropped as a result of two bursty flows competing over the same forwarding element.
Figure 1B:
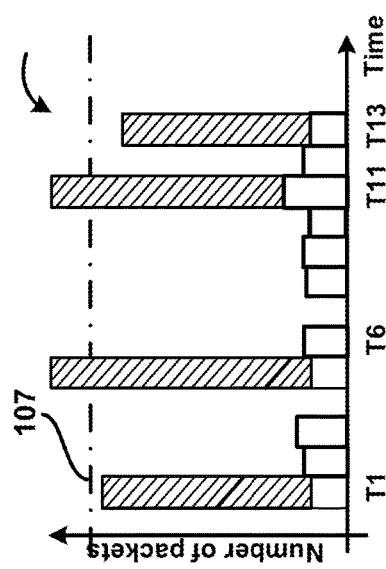
Figure 1C:
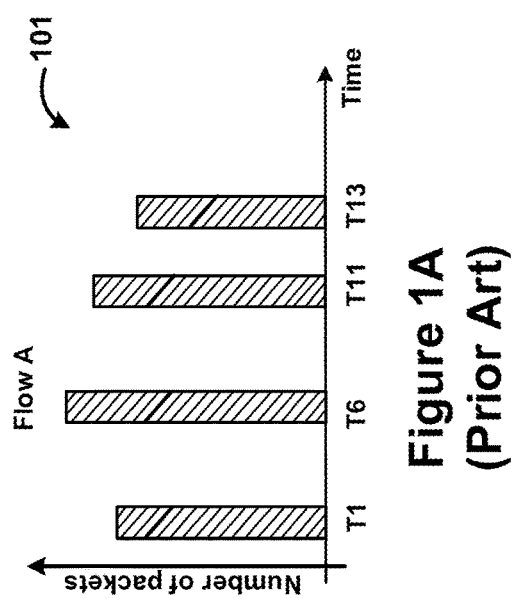
Figure 1D:
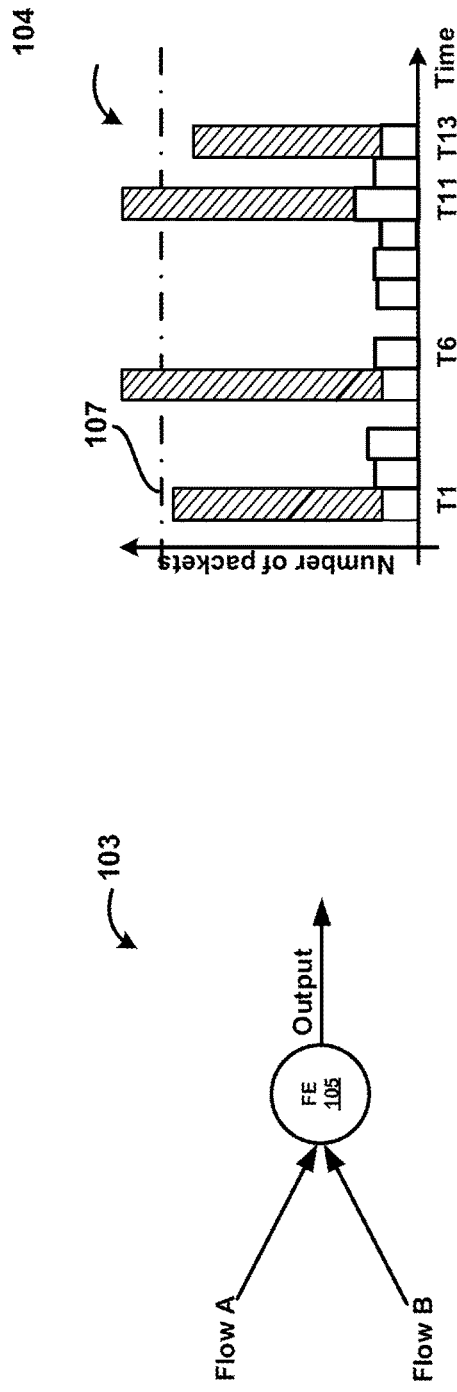

As described, Transport Control Protocol (TCP) may not be efficient in resolving some network congestions, such as congestions caused by flow microbursts and/or when too many flows share the same link. Accordingly, some embodiments provide an efficient mechanism for alleviating (or resolving) congestions at different forwarding elements (e.g., physical and/or logical routers, switches, etc.) that are situated on the paths of bursty flows (e.g., the network paths established between source and destination endpoints). Some embodiments may reduce, or remove, network flow congestions without requiring any change(s) to the TCP stack (e.g., changing TCP variants), network resources (e.g., network interface controllers (NICs) or switches), admission control (e.g., provisioning or migration of virtual computing instances (VCIs), such as virtual machines (VMs) and containers), etc.

In some embodiments, a congestion alleviation (CA) manager residing in central management and control cluster of a datacenter (e.g., a module executing on a controller host, VM, container, etc.) may periodically (or upon request in some embodiments) obtain data related to the flows and forwarding elements of the network (e.g., physical and/or logical networks). The CA manager may receive data related to the flows from the host machines (e.g., the hypervisors of the host machines) and data related to the forwarding elements from the forwarding elements themselves. The periodicity of data collection may depend on the time it takes for TCP to converge to its pick rate. As described above, TCP may reduce the transmission of packets upon receiving a packet drop signal and may speed up the packet transmission when no packet drop signal is received. As such, if the packet transmission rate is not at its peak, the CA manager may not produce accurate results due to inaccurate data collected from the host machines and the forwarding elements.

In certain embodiments, upon detection of a network congestion, the CA manager may reduce the flow rates for bursty flows to reduce the congestion. In certain embodiments, additionally or alternatively, upon detection of a network congestion, the CA manager may move one or more flows from a congested link to alternative equal-cost path(s) that is experiencing less or no congestion. In some embodiments, the CA manager may migrate a subset of (bursty) flows first (e.g., as a fast reaction to the congestion detection) and subsequently, as a slower reaction, reduce the flow rates of the remaining bursty flows.

In some embodiments, the CA manager may determine which flows should be prioritized to be migrated and which paths are most eligible for receiving the flows. For example, in some embodiments, the CA manager may move the flows that are less bursty (or not bursty) and may leave the more bursty flows for rate reduction. In some embodiments, for rate reduction (or rate modification) of the flows, the CA manager may determine which of the flows (e.g., in some embodiments after moving a subset of the flows to other paths) should be rate limited and what the rate for such rate reduction should be (e.g., too high of a rate may cause more congestion, while too low of a rate can hurt the performance of applications running on the endpoints). In some embodiments, the CA manager makes such determinations by calculating the burst size of a number of flows and leveraging a prior observation that flows between two particular endpoints and/or two particular applications running on two communicating endpoints have similar characteristics.

In certain embodiments, the CA manager may determine a cumulative rate for rate modification of a collection of flows passing through a forwarding element simultaneously and not for each flow individually (e.g., as the flows collectively share the buffer of the forwarding element). The CA manager may then use a novel integer linear program (ILP) formulation to calculate the rate for each flow of the group individually. Specifically, in some embodiments, the CA manager uses the determined cumulative rate and burst size of the flows to determine the rates (e.g., for rate modification) and/or uses the burst size and average flow rates of the flows to identify the alternative paths (e.g., for flow migration).

Figure 2:
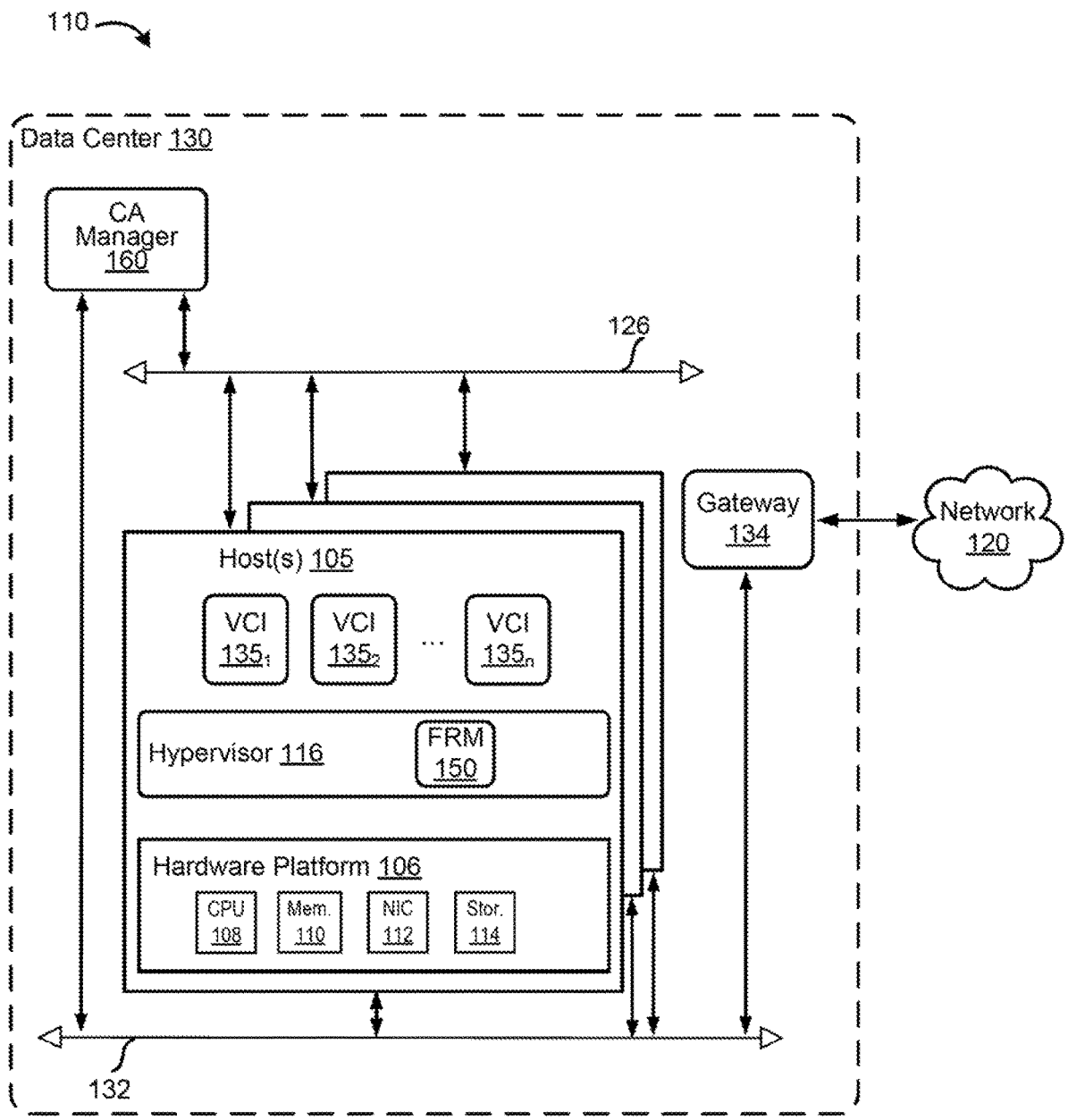
FIG. 2 is a block diagram illustrating a computer system in which one or more embodiments of the present disclosure may be utilized.

FIG. 2 is a block diagram illustrating a computer system 110 in which one or more embodiments of the present disclosure may be utilized. Computer system 110 includes a datacenter 130 connected to a network 120. Network 120 may be, for example, a direct link, a local area network (LAN), a wide area network (WAN), such as the Internet, another type of network, or a combination of these networks.

Datacenter 130 includes host(s) 105, a gateway 134, a management network 126, and a data network 132. Datacenter 130 also includes a congestion alleviation (CA) manager 160 connected to both management network 126 and data network 132. CA manager 160 may be a module running in one of the controllers (e.g., a host machine, a VM, a container, etc.) of a centralized management and control system (not shown in the figure). The centralized management and control system may include one or more hosts (and/or VCIs) that carry out administrative tasks for datacenter 130. The administrative tasks may include, but are not limited to, managing hosts 105, managing VCIs 135 (e.g., VMs) running within each host 105, defining network topologies, provisioning VMs, migrating VMs from one host to another host, load balancing between hosts 105, etc.

The centralized management and control system may also create and maintain one or more logical network overlays implemented (e.g., by the hypervisors 116 of the host machines) on the underlay physical network (e.g., data network 132). Both management and user networks 126 and 132, as well as the overlay logical networks may include multiple forwarding elements (e.g., routers, switches, middle boxes, etc.) that are connected to each other to create different network paths carrying different flows of the network. The different flows may include, but are not limited to, data flows exchanged between the hosts of datacenter 130, data flows exchanged between the hosts of datacenter 130 and other computing systems, such as hosts of other datacenters (e.g., through network 120), management and control flows exchanged between the hosts of datacenter 130 and centralized management and control system of datacenter 130, etc. As will be described in more detail below, CA manager 160 may collect data from the forwarding elements of the networks (e.g., data network 132, management network 126, one or more logical networks implemented by the hypervisors, or any combination of these networks) to determine whether any of the forwarding elements is experiencing a flow congestion (e.g., resulted from one or more flows originated from one or more VCIs 135).

CA manager 160 may use the data collected from the forwarding elements and data collected from host machines 105 (e.g., hypervisors 116 of the host machines) to (i) move a subset of the flows that have caused the congestion to other links (or paths) (e.g., as a fast reaction to the congestion detection), and/or (ii) tame (or smoothen) the burst size of the flows (e.g., remaining flows after migration, such as part of a slower reaction), therefore alleviating (or removing) the detected congestion at the forwarding element(s).

After identifying the flows that have caused a congestion, some embodiments may move a subset of flows to alternative paths by modifying the source TCP port in the outer header (e.g., tunnel header) of the packets of the flows to direct the flows to the alternative paths. More detail about determining which alternative path(s) to use to migrate the flows and which flows to migrate first (e.g., within a group of bursty flows) are descried below with reference to FIG. 7. Additional detail about path migration and TCP header modification is described in the commonly owned U.S. Pat. No. 10,320,681, issued on Jun. 11, 2019, entitled "Virtual Tunnel Endpoints for Congestion-Aware Load Balancing," which is hereby incorporated by reference in its entirety.

As also will be described in more detail below, in some embodiments, CA manager 160 uses a flow rate manager (FRM) 150 that may reside in the hypervisors 116 to identify (e.g., before detecting a congestion at the forwarding elements) a burst size for each group of flows that have similar characteristics (e.g., different flows that are exchanged between the same two applications residing on two different endpoints). CA manager 160 may build a flow profile for each such group of flows detailing whether the flows of the group are bursty and if they are bursty, the burst size of the flows.

FRM 150 may include a rate limiter that reduces the rate of the flows passing through it using a rate limiting mechanism (e.g., any suitable mechanism) in some embodiments.

In some other embodiments, FRM 150 may be a module or application that modifies (e.g., reduces or increases) the rates of the flows passing through the module using one of the techniques described in the commonly owned U.S. Pat. No. 9,019,826, issued on Apr. 28, 2015, entitled "Hierarchical Allocation of Network Bandwidth for Quality of Service," which is hereby incorporated by reference in its entirety.

When a congestion is detected at a forwarding element, CA manager 160 may calculate a cumulative rate for all of the flows (e.g., remaining flows after moving a subset of the flows to alternative paths) that are passing through the congested forwarding element. CA manager 160 may then use an ILP formulation to calculate a rate for reducing the burstiness of each one of the flows using the calculated cumulative rate and the burst size of the flows. Subsequently, CA manager 160 may use FRM 150 to tame (or smoothen) the bursty flows by passing the bursty flows through FRM 150 at the identified (or calculated) rate.

Datacenter 130 may include additional components (e.g., a distributed data storage, etc.) that are not shown in the figure. Networks 126, 132, in one embodiment, may each provide Layer 2 or Layer 3 connectivity in accordance with the Open Systems Interconnection (OSI) model, with internal physical or software defined switches and routers not being shown. Although the management and data network are shown as separate physical networks, it is also possible in some implementations to logically isolate the management network from the data network (e.g., by using different VLAN identifiers) in a shared physical network.

Each of hosts 105 may be constructed on a server grade hardware platform 106, such as an x86 architecture platform. For example, hosts 105 may be geographically co-located servers on the same rack or on different racks. Hardware platform 106 of each host 105 may include components of a computing device, such as one or more central processing units (CPUs) 108, system memory 110, a network interface 112, storage system 114, and other I/O devices, such as, for example, USB interfaces (not shown). Network interface 112 enables each host 105 to communicate with other devices via a communication medium, such as data network 132 or management network 126. Network interface 112 may include one or more network ports, which may be implemented by network devices that may be referred to as network adapters or network interface cards (NICs). In certain embodiments, data network 132 and management network 126 may be different physical networks as shown, and the hosts 105 may be connected to each of the data network 132 and management network 126 via separate NICs or separate ports on the same NIC.

Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines.

In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. VCI 135 may include VMs, containers, Docker containers, data compute nodes, isolated user space instances, namespace containers, and the like. Though certain aspects may be described with respect to a VM, they may similarly be applicable to other VCIs and/or physical endpoints.

Although hosts 105 are shown as including a hypervisor 116 and virtual computing instances 135, in an embodiment, hosts 105 may include a standard operating system instead of a hypervisor 116, and hosts 105 may not include VCIs 135.

Gateway 134 provides hosts 105, VCIs 135, and other components in datacenter 130 with connectivity to one or more networks, such as network 120, used to communicate with one or more remote datacenters or other entities. Gateway 134 may manage external public Internet Protocol (IP) addresses for VCIs 135 and route traffic incoming to and outgoing from datacenter 130 and provide networking services, such as firewalls, network address translation (NAT), dynamic host configuration protocol (DHCP), and load balancing. Gateway 134 may use data network 132 to transmit data network packets to hosts 105. Gateway 134 may be a virtual appliance, a physical device, or a software module running within host 105.

Figure 3:
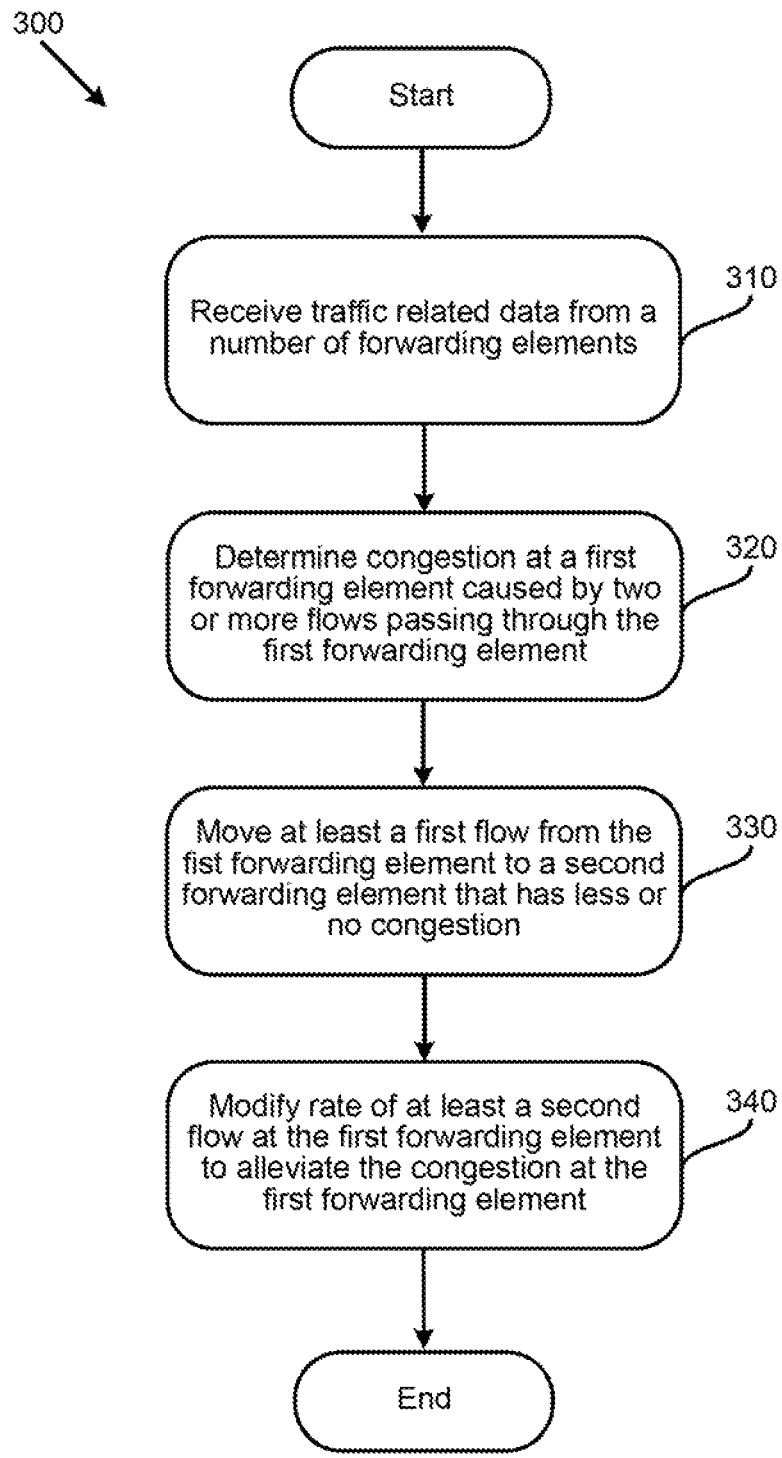
FIG. 3 is a flowchart illustrating an example process/method for alleviating flow congestions in a network, according to an example embodiment of the present application.

FIG. 3 is a flowchart illustrating an example process/method 300 for alleviating flow congestions in a network, according to an example embodiment of the present application. Process 300 may be performed, for example, by a congestion alleviation (CA) manager, such as CA manager 160 described above, with reference to FIG. 2. Process 300 may begin, at 310, by receiving traffic related data from a number of forwarding elements of a network. For example, CA manager 160 (as shown in FIG. 2) may receive information that identifies the flows (e.g., passing through the forwarding elements in network 126 and/or 132), the average link utilization of the forwarding elements, maximum buffer usage of the forwarding elements, etc. CA manager 160 may obtain this information periodically (e.g., every 10 seconds, every 30 seconds, etc.) and/or upon request. In some embodiments, CA manager 160 may leverage different mechanisms for collecting the traffic related data from the forwarding elements. As an example, for a congested interface (i) (e.g., of a forwarding element), the CA manager 160 may use NetFlow to identify the flows ($F_i$) passing through the interface, and may use simple network management protocol (SNMP) to determine the average link utilization ($l_i$) of the interface.

In some embodiments, CA manager 160 may also receive flow related data from hypervisors 116 of host machines 105 (e.g., data identifying the flows passing through the hypervisors). The CA manager may also receive other data from the hypervisors, such as information (e.g., queue size) associated with FRM 150 used by the hypervisors. As will be further described below, the CA manager may use this additional data to determine the burst size of the flows and/or to identify alternative links to migrate the flows from the congested forwarding elements.

Figure 4:
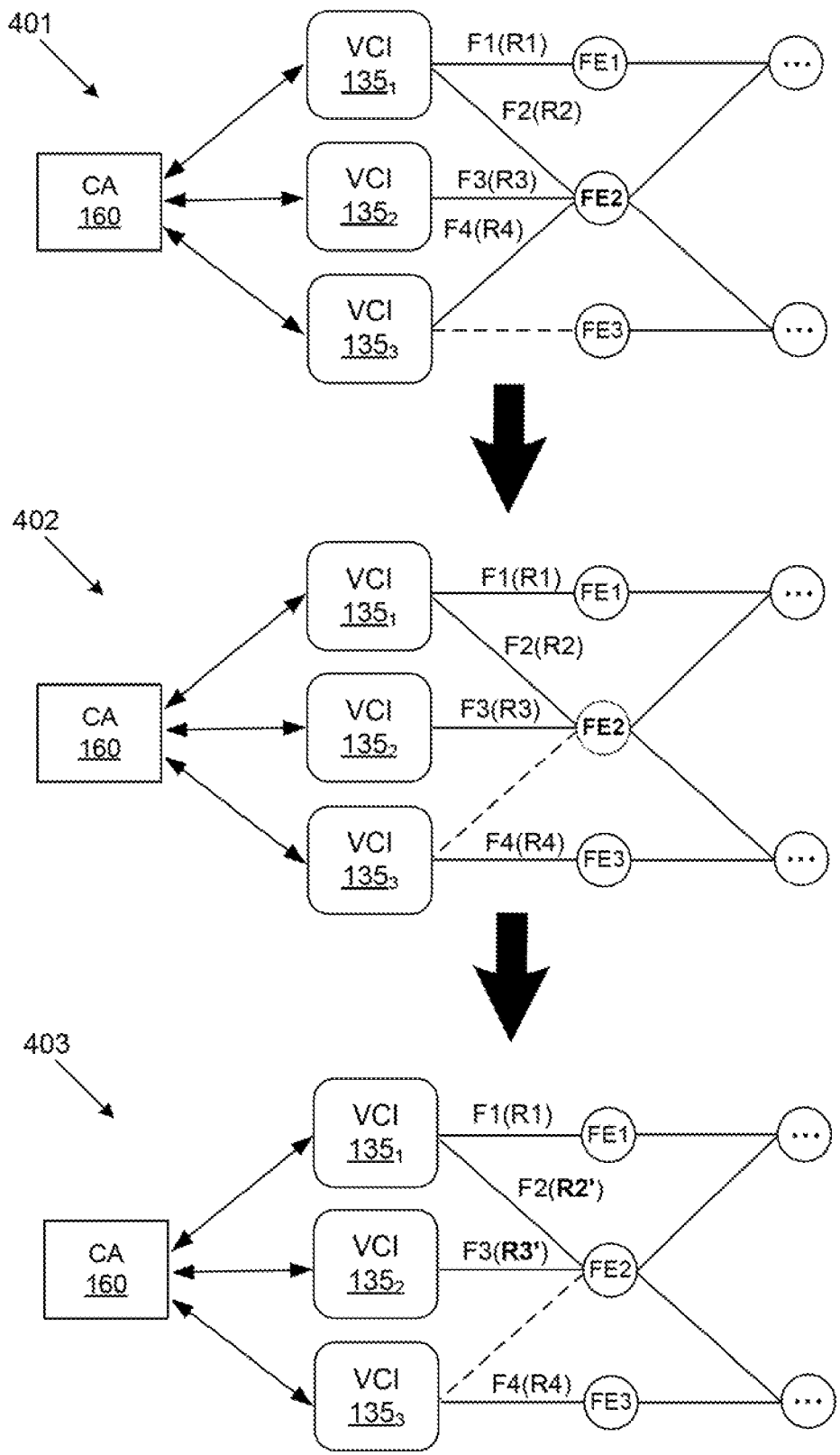
FIG. 4 includes three block diagrams illustrating the alleviation of a flow congestion at a forwarding element, according to an example embodiment of the present application.

FIG. 4 includes three block diagrams 401-403 illustrating alleviating flow congestion at a forwarding element, according to an example embodiment of the present application. Diagram 401 includes CA manager 160 and three VCIs 135$_1$, 135$_2$, and 135$_3$, transmitting different flows (e.g., initiated by the applications running on these VCIs) to one or more other VCIs (not shown in the figure) through at least three forwarding elements FE1 to FE3. Specifically, VCI 135$_1$ is transmitting a first flow F1 having a first rate R1 to forwarding element FE1 and a second flow F2 having a second rate R2 to forwarding element FE2. Similarly, VCI 135$_2$ is transmitting a flow F3 having a rate R3 to forwarding element FE2 and VCI 135$_3$ is also transmitting a flow F4 having a rate R4 to the same forwarding element FE2. As such, the incoming buffer of forwarding element FE2 may be overwhelmed (e.g., the output packet rate of FE2 becomes less than the input packet rate of the switch) and therefore a flow congestion may occur at this forwarding element.

It should be understood that although some of the network links in FIG. 4 are shown as connecting a VCI to multiple forwarding element (e.g., VCI 135$_1$ to FE1 and FE2), in some embodiments, there may be another forwarding element (e.g., a router) that is coupled to a VCI (e.g., VCI 135$_1$) from one side and to one or more other forwarding elements (e.g., FE1 and FE2) from the other side. In other words, a VCI may be able to route the packets of a flow through two or more paths using a router that computes the five-tuple (e.g., source internet protocol (IP) address, source port, destination IP address, destination port, and the network protocol of each packet of the flow) hash of each flow. Each five-tuple hash may be associated with one path. Additionally, it should be understood that even though only three flows (e.g., F2, F3, and F4) are shown to be passing through the congested forwarding element FE2 in FIG. 4, many more flows (e.g., thousands or millions of flows) may pass through a congested forwarding element of a network (e.g., network 132, with reference to FIG. 2, and/or a logical overlay network implemented on network 132).

Returning to FIG. 3, at 320, process 300 may determine, based on the data received from the forwarding elements, that there is a congestion at least at one of the forwarding elements (e.g., at FE2, as shown in FIG. 4). For example, based on the information received from the forwarding elements FE1-FE3, the process may determine that packets are being dropped at the congested forwarding element FE2. The congestion may be identified as being due to bursty flows, in certain embodiments, when there is packet drop and the average link utilization ($l_i$) of a forwarding element (e.g., received using SNMP) is lower than a threshold (e.g., 20%, 25%, 30%, etc.). Such a low link utilization may be an indication of one or more bursty flows passing through the congested switch (e.g., FE2).

After determining that a forwarding element (or an interface of the forwarding element) is congested, in certain embodiments, process 300 may optionally move, at 330, at least one of the flows from the congested forwarding element to another forwarding element that is experiencing less or no congestion. In some embodiments, the process may move one or more flows that are less bursty, or not bursty at all, and leave the more bursty flow(s) for rate modification (e.g., instead of migration). In some embodiments, the process may identify the alternative forwarding elements based on whether they share the same prior hop (e.g., a prior forwarding element) with the congested forwarding element. In some embodiments, the traffic related data obtained from the forwarding elements may include data that indicates unoccupied buffer size and available link capacity of the forwarding elements. In some such embodiments, process 300 may move a flow from a congested forwarding element to an alternative forwarding element when it determines that a peak buffer requirement of the flow is less than the unoccupied buffer size of the alternative forwarding element and/or an average rate of the flow is under the available link capacity of the alternative forwarding element. Process 300 may move each flow to an alternative forwarding element by modifying a source port in the five-tuple header of the packets of the flow to a source port associated with the alternative path. More detail about the mechanism of migrating the flows to other forwarding elements is described below with reference to FIG. 7.

FIG. 4, in diagram 402, illustrates that CA manager 160 has determined that out of the three flows passing though forwarding element FE2 (e.g., flows F2, F3, and F4), flow F4 transmitted by VCI 135$_3$ is less bursty (e.g., than the other two flows F2 and F3), or not bursty at all, and as such has moved flow F4 from forwarding element FE2 to forwarding element FE3 (e.g., from the link between VCI 135$_3$ and FE2 to the link between VCI 135$_3$ and FE3). As such, flow F4 is diagram 402 is being transmitted through the link between VCI 135$_3$ and FE3. In some embodiments, the CA manager may make the determination on the level of burstiness of the flows based on a burst size calculated for each one of the flows. Determining the burst size is described in detail below, with reference to FIGS. 5 and 6.

With further reference to FIG. 3, at 340, additionally or alternatively to 330, process 300 may modify the rates of some (or all) of the flows (e.g., remaining flows after migrating a subset of the flows) at the congested forwarding element in order to alleviate (e.g., resolve or reduce) the congestion at the forwarding element. The process may then end. In order to modify the rates of the bursty flows, as will be described in more detail below, with reference to FIGS. 5 and 6, the process may calculate a cumulative rate for all of the flows that are passing through the congested forwarding element. Using the calculated cumulative rate, the process may identify individual rates for each of the flows. In some embodiments, the sum of individual rates may be equal to the calculated cumulative rate even though each identified individual rate may be different than one or more of the other individual rates. The process may then pass each of the remaining bursty flows through a flow rate manager (e.g., FRM 150, with reference to FIG. 2), while applying the identified rate associated with the passing bursty flow. After applying the identified rate to each flow, the process may send the flow to the forwarding element that was previously determined to be congested.

Diagram 403 of FIG. 4 illustrates that CA manager 160 has calculated new rates R2' (for flow F2) and R3' (for flow F3) and applied these rates to the corresponding flows to smoothen the burstiness of the flows. For example, the CA manager may pass the combination of flows F2 and F3 through a flow rate manager (FRM) multiple times to identify a cumulative rate for both of the flows. The CA manager may then calculate each individual rate R2' and R3' for flows F2 and F3, respectively, and apply these identified rates to the flows (e.g., by passing each flow through an FRM while applying the corresponding identified rate to the FRM). In some embodiments, even though the rates R2' and R3' are different, the sum of these rates (e.g., R2'+R3') is equal to the calculated cumulative rate. As a result of moving flow F4 to the alternative forwarding element FE3 and/or passing the flows F2 and F3 through flow rate managers (e.g., two different rate limiters in parallel) applying the calculated rates R2' and R3' to the FRMs, the CA manager may remove the congestion detected at forwarding element FE2.

As described above, some embodiments may calculate the burst size for the flows that have similar characteristics (e.g., that have the same source and destination applications) before identifying and/or alleviating the flow congestions (e.g., since the burst size after congestion may be affected by the control mechanism of TCP which may reduce the flow rates). In some embodiments, the CA manager (or another module) may identify the burst size for a flow by sending the flow through an FRM (e.g., a rate limiter) residing in the hypervisor and monitoring the queue size of the FRM. In some embodiments the rate limit for the FRM may be set to the peak size (e.g., 10 Gbps) of a virtual NIC (e.g., for logical forwarding elements) or a physical NIC (e.g., for physical forwarding elements).

Figure 5A:
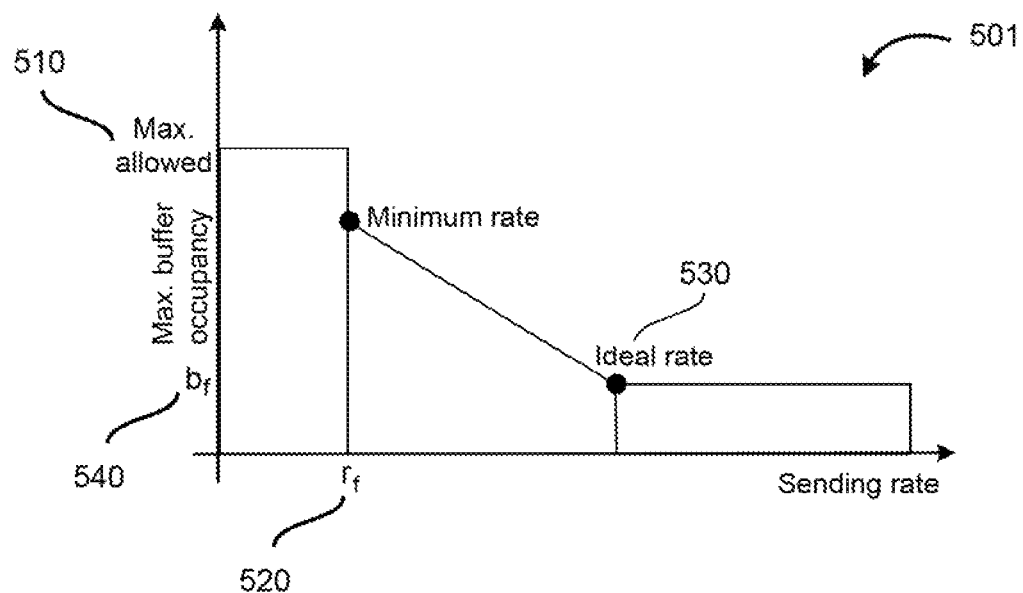
FIGS. 5A-5B include two different graphs used for the calculation of burst size for a flow, according to an example embodiment of the present application.
Figure 5B:
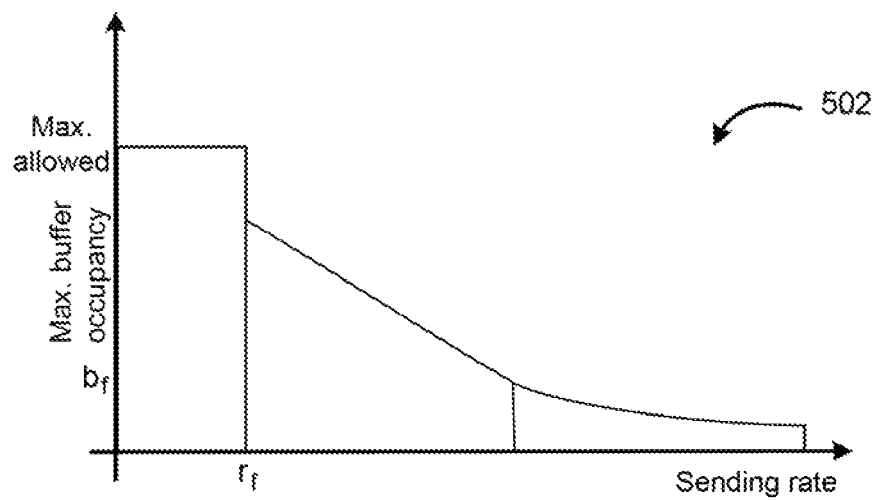

FIGS. 5A and 5B include two different graphs 501 and 502 used for the calculation of burst size for a flow, according to an example embodiment of the present application. Graph 501 shows maximum buffer occupancy (e.g., of an FRM or rate limiter) as a function of the sending rate of a flow. In particular, graph 501 represents a theoretical graph modeling the maximum occupancy level that a buffer of the FRM would achieve as packets of a particular flow are received by the FRM, and buffered in the buffer by the FRM until the packets are sent by the FRM. As shown in graph 501, the maximum occupancy level for the buffer is shown for different sending rates used by the FRM for sending the received packets of the flow. For example, a bursty flow may be passed through the FRM. If, as shown, the sending rate is 0, the FRM is not sending any packets of the flow that are received and therefore maintains all the packets in the buffer and the packets do not leave the buffer as they are not sent. Therefore, as shown, the buffer of the FRM will reach its maximum allowed buffer occupancy 510 (e.g., the overall size of the buffer) and then subsequent packets of the flow received at the FRM will be dropped.

Further, as the sending rate is increased, if the sending rate is less than the rate at which packets are received for the flow by the FRM, then the buffer of the FRM will still reach its maximum allowed buffer occupancy 510 as packets are received at the FRM faster than they are sent, meaning the buffer builds and overruns. A minimum sending rate 520 (rf) for the flow is shown, which is the lowest sending rate at which the buffer of the FRM no longer reaches its maximum allowed buffer occupancy 510 and, at the same time, no packet is dropped. The minimum sending rate 520 may equal, for example, the average rate at which the packets of the flow are received by the FRM. In particular, if the sending rate of packets equals the receive rate, then the buffer may not overrun as packets are not received faster than they are sent.

Continuing, as shown, as the sending rate is increased from the minimum sending rate 520, the maximum buffer occupancy of the buffer of the FRM decreases until an ideal sending rate 530 is reached (e.g., at maximum buffer occupancy 540). In particular, between the minimum sending rate 520 and the ideal sending rate 530, as the sending rate is increased, the ratio of packet sent rate to packet received rate increases, thereby requiring less buffer occupancy to store received packets until they are sent.

After the ideal sending rate 530, even if the sending rate is increased, the maximum buffer occupancy of the buffer of the FRM does not theoretically decrease. In particular, if the flow is bursty and many packets are received in a burst, almost all the packets of the burst will need to be buffered before they can be sent. Therefore, no matter what the sending rate greater than the ideal sending rate 530, the maximum buffer occupancy remains the same, and is at least theoretically approximately equal to the burst size (bf) (or maximum buffer occupancy 540) of the flow.

Therefore, in order to evaluate the burst size of a flow, the CA manager of some embodiments may send a flow through an FRM with different rates. The CA manager may determine the burst size, in some embodiments, as the minimum sending rate (i.e., ideal sending rate 530) where the maximum buffer occupancy stops changing (e.g., by a threshold, substantially, etc.) as sending rate is increased. In some embodiments, the CA manager may monitor the maximum buffer (or queue) occupancy of the FRM when handling the flow when no rate limiting is applied to the flow by the FRM for sending packets. The burst size, in some such embodiments, may then be determined to be the maximum buffer occupancy of the FRM when no rate limiting is applied to the flow for sending packets as described. Additionally, since the flows between the same pair of applications (e.g., the source and destination applications communicating with each other) have similar behavior, the CA manager may not need to characterize each new flow exchanged between the same pair of applications. That is, in some embodiments, the CA manager uses the measurements (e.g., the burst size) calculated for the prior flows exchanged between the same pair of applications.

As discussed, graph 501 may be a theoretical or ideal graph. In practice, however, when the CA manager sends a flow through an FRM with different rates, the resulting graph may more closely resemble graph 502, which is similar to graph 501. Graph 502, however, unlike graph 501 does show some decrease (e.g., but below a threshold) in buffer occupancy as the sending rate is increased beyond the ideal sending rate 530. This may be due to some packets of a burst being transmitted even as the packets of the burst are being received, as in practice not all packets of a bursty flow are received at the exact same time. This way, the CA manager may generate piece-wise linear graph 502 to model the buffer occupancy for each new flow, thereby determining the burst size of the flow.

Figure 6A:
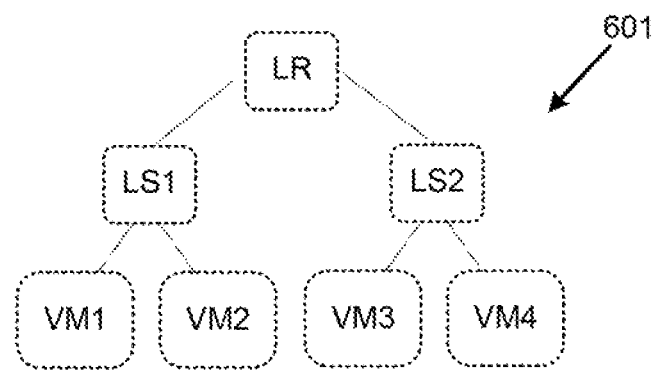
FIGS. 6A-6B include two block diagrams illustrating the calculation of burst size for multiple flows exchanged between multiple pairs of applications running on different virtual machines, according to an example embodiment of the present application.
Figure 6B:
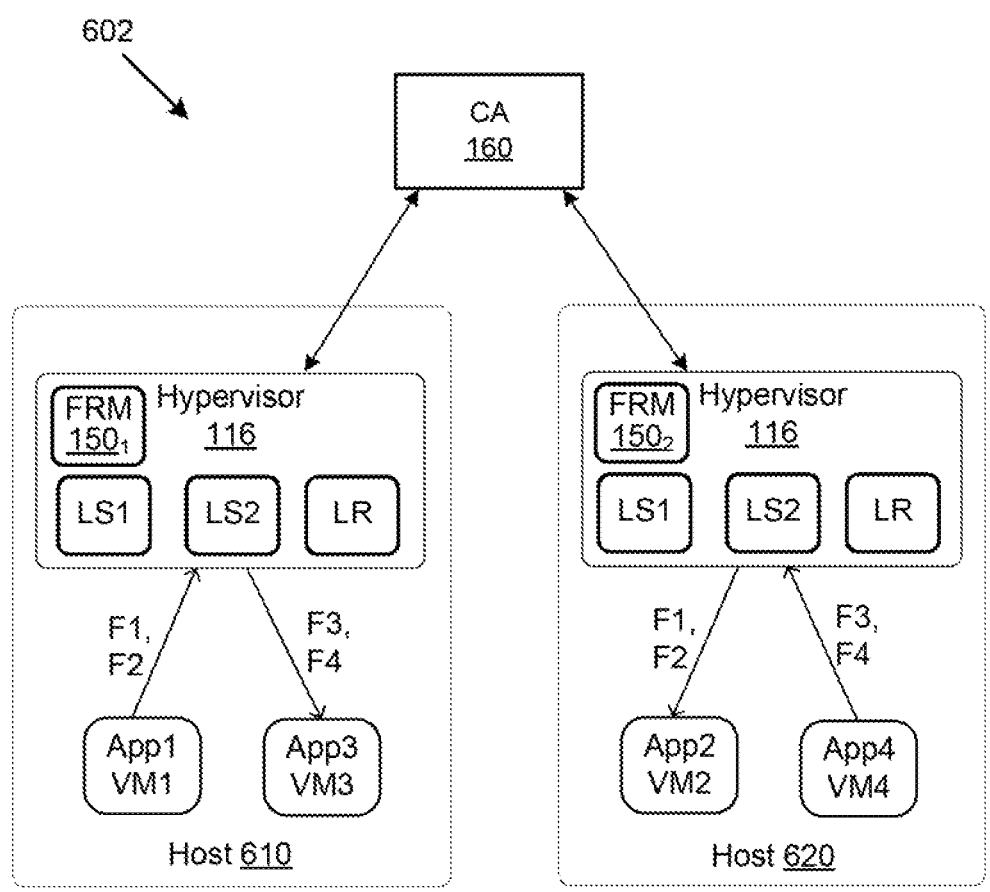

FIGS. 6A and 6B include block diagrams 601 and 602 illustrating the calculation of burst size for four flows exchanged between two pairs of applications running on different virtual machines, according to an example embodiment of the present application. More specifically, block diagrams 601 illustrates a logical network that includes, among other forwarding elements, a layer three logical router (LR) and two layer two logical switches (LS1 and LS2). Virtual machines VM1 and VM2 are logically coupled to the first logical switch LS1, while virtual machines VM3 and VM4 are logically coupled to the second logical switch LS2. Additionally, both of the logical switches are coupled to the logical router LR and may communicate with each other through this logical router.

Block diagram 602 illustrates part of a physical network that implements the logical network of block diagram 601. More specifically, block diagram 602 includes two host machines 610 and 620 that may communicate to each other through a physical data network (e.g., network 132, with reference to FIG. 2), and that may also communicate with CA manager 160 through a physical management network (e.g., network 126, with reference to FIG. 2). As described above, each of the physical networks may include a number of forwarding elements that route the control and data flows exchanged between host machines 610 and 620, as well as between the host machines and CA manager 160. As shown in the figure, each of the host machines includes a hypervisor 116 which, among other tasks, may implement the logical forwarding elements (e.g., as one or more virtual switches, virtual routers, and/or tunneling endpoints) shown in the logical network 601. As such, when hypervisor 115 of any of the host machines receives a packet from a VM (e.g., VM1), it performs the network processing for the logical switch to which that VM logically couples, as well as the network processing for any additional logical forwarding elements (e.g., logical router processing if the packet is sent to an external network, logical router processing and processing for another logical switch in the network if the packet is sent to another VM coupled to the other logical switch, etc.).

As shown in the figure, since VM1 coupled to LS1 and VM3 coupled to LS2 are both running in host 610, hypervisor 116 of host 610 is implementing (e.g., performing the forwarding operations of) both logical switches LS1 and LS2, as well as logical router LR to which the logical switches are coupled. Similarly, hypervisor 116 of host 620 is implementing both logical switches LS1 and LS2, and logical router LR since VM2 and VM4 are executing in host 620. For example, each of the hypervisors 116 may implement LS1, LS2, and LR1 as one or more virtual switches and a virtual router, respectively. It should be noted that the representations of the logical forwarding elements, as shown in the hypervisors 116, are for better understanding of how the logical forwarding elements are implemented by the hypervisors in some embodiments, and otherwise, logical forwarding elements do not reside on the physical architecture.

CA manager 160 may receive the information about the forwarding elements (e.g., logical forwarding elements shown in the figure and/or physical forwarding elements (not shown) of the physical data and management networks) and the flows passing through the forwarding elements in order to alleviate any potential congestions at these forwarding elements. In the illustrated example, an application App1 running on virtual machine VM1, which is executing on host 610, is sending two different flows F1 and F2 to another application App2 running on virtual machine VM2, which is executing on host 620. Also, an application App4 running on virtual machine VM4, which is executing on host 620, is sending two different flows F3 and F4 to another application App3 running on virtual machine VM3, which is executing on host 610.

As described above, since flows F1 and F2 have similar characteristics (e.g., they are exchanged between the same pair of applications App1 and App2), CA manager 160 may pass only one of these flows through FRM $150_1$ (residing in hypervisor 116 of host 610) at different rates to calculate a burst size for both of these flows (e.g., as described above, with reference to FIGS. 5A and 5B). Similarly, CA manager 160 may pass only one of the flows F3 and F4 (e.g., because of their common characteristic) through FRM $150_2$ (residing in hypervisor 116 of host 620) at varying rates to calculate a burst size for both of these flows. CA manager 160 may then create a profile for each pair of applications such that for any future flows exchanged between the same pair of applications, the profile data (e.g., that is stored at a memory) may be retrieved to determine the burst sizes of the flows without a need for any additional processing or calculation. As will be described next, CA manager 160 may use the calculated burst sizes for determining which flows to migrate to alternative paths, and/or the rates for rate limiting the remaining flows.

In some embodiments, when CA manager 160 detects congestion at a forwarding element (e.g., based on the traffic related data it receives from the forwarding elements, as described above), the CA manager may create a new group of flows passing through the congested forwarding element (e.g., if an identical group does not exist). Since the congestion may have been caused due to packets arriving from all of the flows of the group, the CA manager may determine a cumulative rate for all of the flows of the same group. Because of the resource limitations, as described above, it may not be efficient to rate limit all of the flows, nor may it be adequate to reduce the flow rates uniformly for all of the flows. Thus, the rate calculations performed by the CA manager may include two parts. First, the CA manager may identify a cumulative rate for the flows of the same group (e.g., passing through the same congestion point), and may then calculate individual rates for each flow of the group such that the sum of individual rates may be equal to the cumulative rate of the group in some embodiments.

In some embodiments, the CA manager may leverage a binary search algorithm in which different rates for the group are tried to find a rate that does not cause congestion for the forwarding element. The binary search algorithm may try different rates for the group of the flows and determine whether a congestion is caused at the forwarding element. If the CA manager detects congestion at a particular rate, it may reduce that rate in the next attempt. Similarly, when no congestion is detected for a particular rate, the CA manager may increase the rate in the next attempt. In each attempt, the difference in the increased/decreased rate may be half of the previous attempt in some embodiments. Once a cumulative rate for a group of flows is determined, the CA manager may calculate an individual rate (xf) for each flow of the group using an integer linear program (ILP) which is detailed next. The individual rates may be assigned in proportion to the weight of the application and the burst size associated with each flow. Different objectives in assigning the flow rates may include, but are not limited to, minimizing the max buffer size, minimize the maximum latency, minimizing the maximum buffer occupied, determining fair delays (e.g., resulting in having the same (or close to same) buffer sizes) across all queues, etc.

For example, to minimize the maximum latency, the latency to send the data for the f-th flow may be calculated as $$"lf = \frac{bf}{xf}"$$

(which may depend on the buffer size used by the flows). In minimizing the maximum buffer size, which is the objective in the ILP used for calculating the individual rates, the objective may be synonymous to minimizing the maximum latency, except that only the maximum buffer size (e.g., used by the flows) is minimized. The projected maximum buffer occupancy of the f-th flow $$(b_f^{next}),$$

in some embodiments, for the next cycle may depend on the "xf".

$$"b_f^{next}"$$

may be equal to $$"bf \times \frac{xf}{rf}"$$

in some embodiments.

The ILP for calculating individual rates (xf) to apply to flow rate managers (e.g., rate limiters) of the hypervisor to smoothen the burstiness of the flows with the objective of minimizing the buffer occupancy (or minimum z) may be formulated as below:

Constraints (resource capacity): $\forall h \in H, y_f^h \times w_f \leq C_h$     (1)

Cumulative rate: $\forall c \in C, \Sigma_{f \in F} \; x_f \times m_f^c \leq T_c$     (2)

Expressing z: $\forall f \in F, z \geq b_f^{next}$, or: $\forall f \in F, z \geq bf \times \frac{xf}{rf}$     (3)

Expressing $w_f$ (binary): $\forall f \in F, 0 \leq 1 - w_f \leq \frac{xf}{Bh}$     (4)

Capping $x_f$ to maximum bandwidth: $\forall f \in F, x_f \leq B_h$     (5)

In the above ILP, "$x_f$" is the rate limit on the f-th flow, "$b_f$" is the current maximum buffer occupancy of the f-th flow normalized to the flow's weight, $$"b_f^{next}"$$

is the projected maximum buffer occupancy of the f-th flow, "$r_f$" is the current rate limit on the f-th flow, "$C_h$" is the number of rate limiter queues on the h-th host, "$T_c$" is the target rate for the c-th congestion point, "$B_h$" is the maximum bandwidth of the h-th host, "$m_f^c$" is set if the f-th flow flows through the c-th congestion point, "$y_f^h$" is set if the f-th flow starts on the h-th host, and "z" is the minimum buffer occupancy.

Additionally, for the constraints (resource capacity) in the above ILP, the CA manager may rate limit the flows without exhausting the FRM queue's limitation. For each host, in some embodiments, $C_h$ denotes the number of flows that can be rate limited on the h-th host. For the cumulative rate, the total rate of the flows in a congestion point may always be less than the target rate for the congestion point. Lastly, for capping the $x_f$, the maximum rate for the FRM for each flow may be at most the bandwidth of the host (or any other limit that can be set by an administrator).

As described above, in some embodiments, upon detection of congestion at a forwarding element, the CA manager may migrate a subset of flows from the congested forwarding element to one or more alternative paths. In some embodiments, additionally or alternatively, the CA manager may smoothen the burstiness of the (e.g., remaining) flows at the forwarding element. In certain embodiments, the CA manager may migrate the flows only if such migration does not cause congestion on the alternative paths (e.g., by overwhelming a switch buffer on an alternative path). To avoid congestion on the alternative path(s), the CA manager may use the peak buffer utilization report it receives from the forwarding elements. The peak buffer utilization report (e.g., reported in bytes in some embodiments) tells the CA manager about the worst case utilization at the individual interfaces (e.g., of the forwarding elements). Using this metric, the CA manager can calculate the amount of buffer of an interface that is left unoccupied. In one embodiment, the CA manager may move one or more flows from a congested forwarding element as long as (i) a peak buffer requirement of the flow is less than the unoccupied buffer and (ii) the average flow rate is under the available link capacity.

The CA manager, in some embodiments, makes the decision on moving the flows collectively and not for each flow separately. This is because if two different flows that have caused congestions on first and second switches are separately decided to be migrated to a third switch, such a migration may cause a congestion at the third switch. However, if the CA manager determines the migration of the same two flows collectively, it may forgo migrating the flows when it realizes that moving both flows together would cause the buffer of the third switch to exceed its capacity.

For migrating the flows, the CA manager may select an equal-cost path compared to the existing path of the flows (e.g., selecting equivalent forwarding elements that share the same prior hop with the congested forwarding element). In some embodiments, the CA manager may use the source port field in the outer or tunnel (e.g., VxLAN tunnel) headers of the packets of the flows to change their paths. To do so, the CA manager may obtain the flow related data from the equivalent forwarding elements (e.g., using NetFlow). The CA manager may collect the source port information from the obtained flow related data (e.g., in the VxLAN header of the packets associated with the flow). The CA manager may then change the source port (e.g., in the VxLAN header) of the candidate flow(s) that are to be moved to selected alternative path(s). The new source port inserted in the packet headers is associated with the selected or candidate alternative path(s) in some embodiments.

As there can be multiple congestion points, flows can be rerouted to one or more paths from multiple congestion points. The CA manager may associate multiple virtual paths to each individual path, such that an individual physical path may include an aggregation of several different virtual paths. In some embodiments, the number of virtual paths associated with an alternative path may be equal to a number of congested points from which traffic can be rerouted to that alternative path. The CA manager may identify the available resources for each alternative path in some embodiments. For example, in one embodiment, the CA manager may identify the remaining capacity (Q) and buffer (W) for each alternative path.

As an example, for path P1 the CA manager may determine Q1, as the remaining capacity, and W1, as the remaining buffer of the path. As each path may have multiple forwarding elements, Q and W may be calculated based on the minimum of remaining capacities and buffers among those forwarding elements. The CA manager may then divide the resources on individual alternative paths equally among their corresponding virtual paths. If there are n congested paths whose flows can be rerouted to the path P1, then amount of resources available for each virtual path on P1 would be $$\frac{Q1}{n} \text{ and } \frac{W1}{n}.$$

Similar to Q and W for physical paths, two variables (e.g., R and B) are denoted for the remaining capacity and buffer of each virtual path.

The CA manager of some embodiments may use a novel bin packing algorithm for migrating the flows. The CA manager may create different bins based on the ratios of average flow rates and buffer sizes of the interfaces and then assign the candidate flows to the created bins. The CA manager may calculate the same ratio for the alternative paths and associate the bins to the paths having the nearest ratio.

Figure 7:
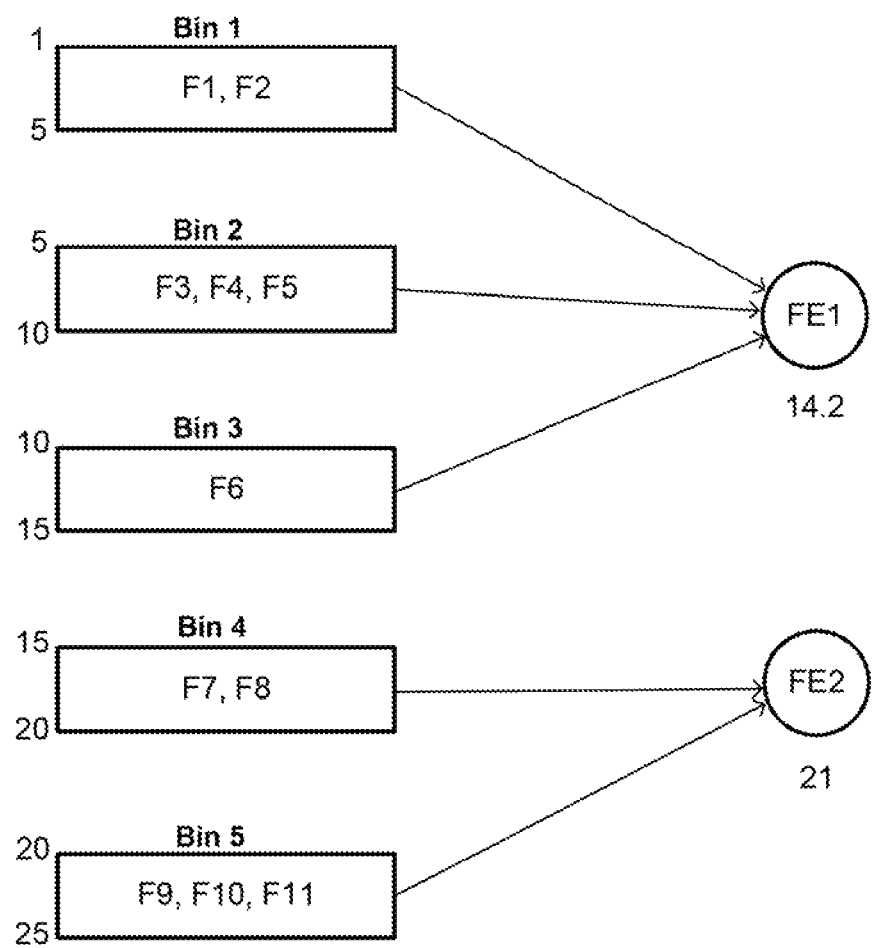
FIG. 7 is a block diagram illustrating a bin packing algorithm used for migrating the flows to alternative paths, according to an example embodiment of the present application.

FIG. 7 is a block diagram illustrating a bin packing algorithm used for migrating the flows to alternative paths, according to an example embodiment of the present application. The bin packing algorithm shown in FIG. 7, has two dimensions (instead of a common bin packing problem having one dimension), (i) available link capacity, and (ii) available buffer capacity. In some embodiments, the CA manager may create fix sized bins based on the ratios of available link capacity to available buffer capacity. For each flow that has to be migrated, the CA manager of some embodiments may also calculate the ratio of average rate to buffer size (which is the same as the burst size) of the flow. Such a ratio for the f-th flow may be denoted as $r_f$. The CA manager may then add the flow to a bin based on the calculated ratio $r_f$.

Similar to the flows, the CA manager may calculate the ratio of the average rate to the buffer size associated with each virtual path. This ratio may be denoted as $$r_p = \frac{Rp}{Bp}.$$

The CA manager may then assign the flows in the bins to paths using the nearest neighbor approach. That is, for each flow in a bin, the CA manager may select a path that has a ratio closest to the average ratio of the bin. The reason for such an approach is that the flows that are heavy in one dimension (e.g., on the average rate or buffer) are assigned to a path that is also heavy in the same dimension, which may facilitate fitting more objects (flows) to alternative bins (paths). The above described algorithm may run in O(n) time, where n is the number of flows being migrated. Additionally, computation for each congestion point may be done independently in some embodiments which may help amplify the computation speed by a factor based on the number of congestion points.

FIG. 7 shows two forwarding elements FE1 and FE2 as two alternative paths for migrating flows F1-F11 that are currently passing through a congested forwarding element (not shown in the figure). For each of the forwarding elements FE1 and FE2, as described above, the CA manager may calculate the ratio of the remaining capacity (Q) to the remaining buffer size (W). As shown in the figure, this ratio for FE1 is 14.2, while the ratio for FE2 is 21.

Similarly, for each of the flows F1-F11, the CA manager may calculate the ratio of the average rate to the burst size of the flow. Each of the created bins has a low limit of that ratio and a high limit of that ratio. For example, Bin 1 has a low limit of 1 and high limit of 5, while Bin 4 has a low limit of 15 and high limit of 20. In the illustrated example, flows F7 and F8 are assigned to Bin 4. This means that the ratio calculated for flows F7 and F8 are between 15 and 20. Additionally, as described above, after calculating the ratios and assigning the flows to different bins, the CA manager of some embodiments may assign the flows of the bins to the forwarding element (or path) that has the nearest ratio. As such, as shown in the figure, flows F1-F6 that are assigned to bins 1 to 3 will be migrated to forwarding element FE1 (which has the nearest ratio of 14.2 for bins 1-3), while flows F7-F11 that are assigned to bins 4 and 5 will be migrated to forwarding element FE2 (which has the nearest ratio of 21 for bins 4 and 5).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for alleviating flow congestion at forwarding elements, comprising:
   receiving traffic related data from a plurality of forwarding elements of a network, wherein each of the plurality of forwarding elements comprises a router or a switch;
   based on the received traffic related data, determining congestion at a first forwarding element of the plurality of forwarding elements caused by one or more flows passing through the first forwarding element at a first rate;

calculating a second rate for the one or more flows such that when the one or more flows pass through the first forwarding element at the second rate the congestion at the first forwarding element is alleviated, wherein:
the second rate is calculated based on a burst size of the one or more flows; and
the burst size is determined by monitoring occupancy of a queue attributable to the one or more flows; and rate limiting the one or more flows by passing the one or more flows through a flow rate manager at the calculated second rate before transmitting the one or more flows to the first forwarding element.

2. The method of claim 1, wherein the one or more flows comprise a first flow of a plurality of flows, and further comprising migrating a second flow of the plurality of flows to a second forwarding element of the plurality of forwarding elements before rate limiting the first flow of the plurality of flows.

3. The method of claim 2, wherein the second flow is migrated before rate limiting the first flow based on the second flow having a smaller burst size than the first flow.

4. The method of claim 2, wherein the traffic related data comprises a peak buffer utilization report received for the first and second forwarding elements, wherein migrating the second flow comprises, before migrating the second flow to the second forwarding element:
determining that a peak buffer requirement of the one or more flows is less than an unoccupied buffer of the second forwarding element; and
determining that an average flow rate of the one or more flows is under an available link capacity of the second forwarding element,
wherein the unoccupied buffer of the second forwarding element and the available link capacity of the second forwarding element are part of the peak buffer utilization report.

5. The method of claim 1, wherein the traffic related data comprises an average link utilization of the first forwarding element, wherein determining the congestion at the first forwarding element comprises determining that the average link utilization of the first forwarding element is lower than a threshold, which indicates that the one or more flows comprise one or more bursty flows.

6. The method of claim 1, wherein determining the burst size comprises passing the one or more flows through the flow rate manager.

7. The method of claim 1, wherein the one or more flows comprise a plurality of flows, wherein rate limiting the one or more flows comprises:
calculating a cumulative rate for the plurality of flows; and
determining an individual rate to be applied for rate limiting each of the plurality of flows, such that a sum of the individual rates is equal to the cumulative rate, wherein a first individual rate calculated for a first flow of the plurality of flows is different than a second individual rate calculated for a second flow of the plurality of flows.

8. A non-transitory computer-readable medium comprising instructions that, when executed by one or more processors of a computing system, cause the computing system to perform a method for alleviating flow congestion at forwarding elements, the method comprising:

receiving traffic related data from a plurality of forwarding elements of a network, wherein each of the plurality of forwarding elements comprises a router or a switch;

based on the received traffic related data, determining congestion at a first forwarding element of the plurality of forwarding elements caused by one or more flows passing through the first forwarding element at a first rate;

calculating a second rate for the one or more flows such that when the one or more flows pass through the first forwarding element at the second rate the congestion at the first forwarding element is alleviated, wherein:
the second rate is calculated based on a burst size of the one or more flows; and
the burst size is determined by monitoring occupancy of a queue size attributable to the one or more flows; and rate limiting the one or more flows by passing the one or more flows through a flow rate manager at the calculated second rate before transmitting the one or more flows to the first forwarding element.

9. The non-transitory computer-readable medium of claim 8, wherein the one or more flows comprise a first flow of a plurality of flows, the method further comprising migrating a second flow of the plurality of flows to a second forwarding element of the plurality of forwarding elements before rate limiting the first flow of the plurality of flows.

10. The non-transitory computer-readable medium of claim 9, wherein the second flow is migrated before rate limiting the first flow based on the second flow having a smaller burst size than the first flow.

11. The non-transitory computer-readable medium of claim 9, wherein the traffic related data comprises a peak buffer utilization report received for the first and second forwarding elements, wherein migrating the second flow comprises, before migrating the second flow to the second forwarding element:
determining that a peak buffer requirement of the one or more flows is less than an unoccupied buffer of the second forwarding element; and
determining that an average flow rate of the one or more flows is under an available link capacity of the second forwarding element,
wherein the unoccupied buffer of the second forwarding element and the available link capacity of the second forwarding element are part of the peak buffer utilization report.

12. The non-transitory computer-readable medium of claim 8, wherein the traffic related data comprises an average link utilization of the first forwarding element, wherein determining the congestion at the first forwarding element comprises determining that the average link utilization of the first forwarding element is lower than a threshold, which indicates that the one or more flows comprise one or more bursty flows.

13. The non-transitory computer-readable medium of claim 8, wherein determining the burst size comprises passing the one or more flows through the flow rate manager.

14. The non-transitory computer-readable medium of claim 8, wherein the one or more flows comprise a plurality of flows, wherein rate limiting the one or more flows comprises:
calculating a cumulative rate for the plurality of flows; and
determining an individual rate to be applied for rate limiting each of the plurality of flows, such that a sum of the individual rates is equal to the cumulative rate, wherein a first individual rate calculated for a first flow of the plurality of flows is different than a second individual rate calculated for a second flow of the plurality of flows.

15. A computer system, comprising:
a memory; and
a processor coupled to the memory, the processor being configured to:
receive traffic related data from a plurality of forwarding elements of a network, wherein each of the plurality of forwarding elements comprises a router or a switch;
based on the received traffic related data, determining congestion at a first forwarding element of the plurality of forwarding elements caused by one or more flows passing through the first forwarding element at a first rate;
calculate a second rate for the one or more flows such that when the one or more flows pass through the first forwarding element at the second rate the congestion at the first forwarding element is alleviated, wherein:
the second rate is calculated based on a burst size of the one or more flows; and
the burst size is determined by monitoring occupancy of a queue size attributable to the one or more flows; and
rate limit the one or more flows by passing the one or more flows through a flow rate manager at the calculated second rate before transmitting the one or more flows to the first forwarding element.

16. The computer system of claim 15, wherein the one or more flows comprise a first flow of a plurality of flows, wherein the processor is further configured to migrate a second flow of the plurality of flows to a second forwarding element of the plurality of forwarding elements before rate limiting the first flow of the plurality of flows.

17. The computer system of claim 16, wherein the traffic related data comprises a peak buffer utilization report received for the first and second forwarding elements, wherein the processor is further configured to, before migrating the second flow to the second forwarding element:
determine that a peak buffer requirement of the one or more flows is less than an unoccupied buffer of the second forwarding element; and
determine that an average flow rate of the one or more flows is under an available link capacity of the second forwarding element,
wherein the unoccupied buffer of the second forwarding element and the available link capacity of the second forwarding element are part of the peak buffer utilization report.

18. The computer system of claim 15, wherein the traffic related data comprises an average link utilization of the first forwarding element, wherein determining the congestion at the first forwarding element comprises determining that the average link utilization of the first forwarding element is lower than a threshold, which indicates that the one or more flows comprise one or more bursty flows.

19. The computer system of claim 15, wherein determining the burst size comprises passing the one or more flows through the flow rate manager.

20. The computer system of claim 15, wherein the one or more flows comprise a plurality of flows, wherein rate limiting the one or more flows comprises:
calculating a cumulative rate for the plurality of flows; and
determining an individual rate to be applied for rate limiting each of the plurality of flows, such that a sum of the individual rates is equal to the cumulative rate, wherein a first individual rate calculated fora first flow of the plurality of flows is different than a second individual rate calculated for a second flow of the plurality of flows.

* * * * *